Feb. 13, 1940.　　　　　E. SHURTS　　　　　2,190,165
DAIRY APPLIANCE
Filed July 21, 1937　　　　2 Sheets-Sheet 2
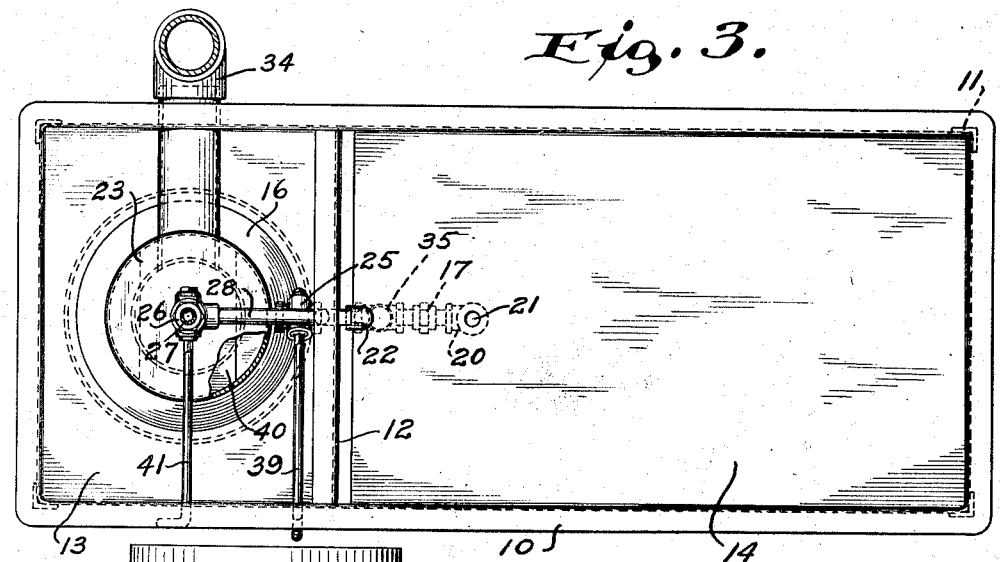
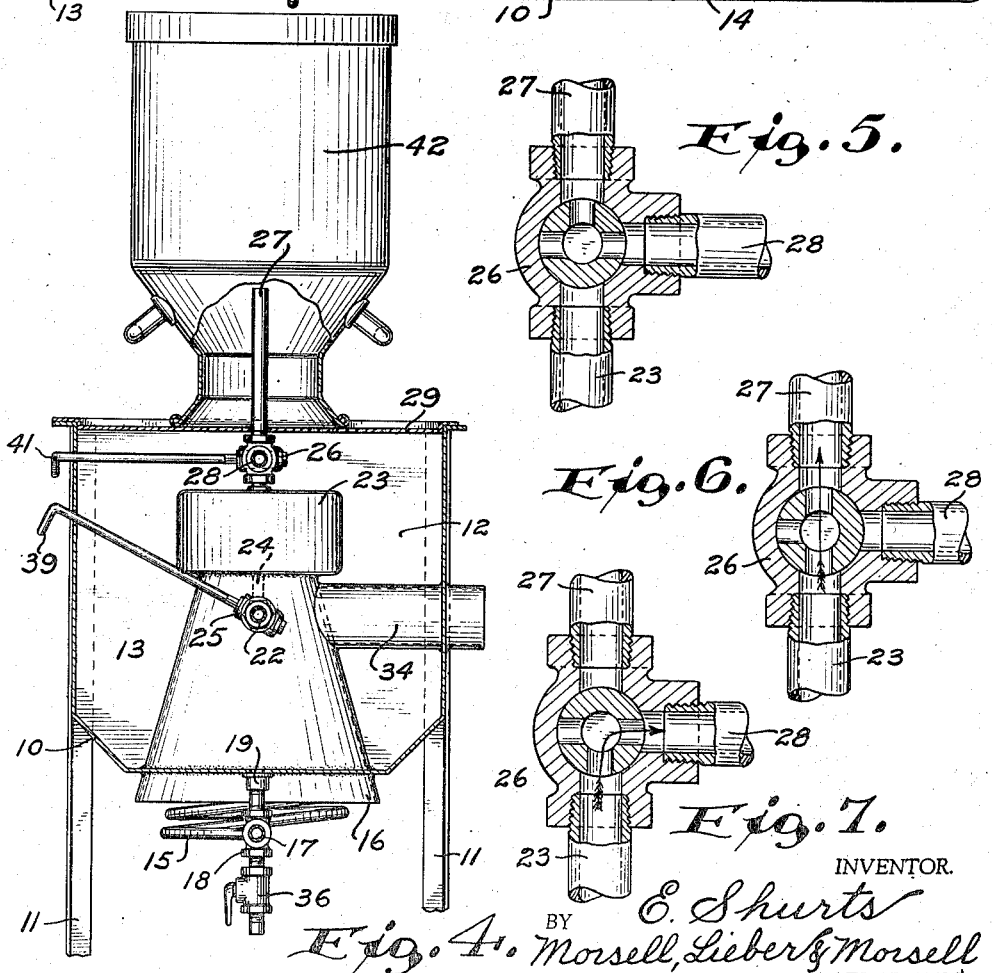
INVENTOR.
E. Shurts
BY Morsell, Lieber & Morsell
ATTORNEYS.

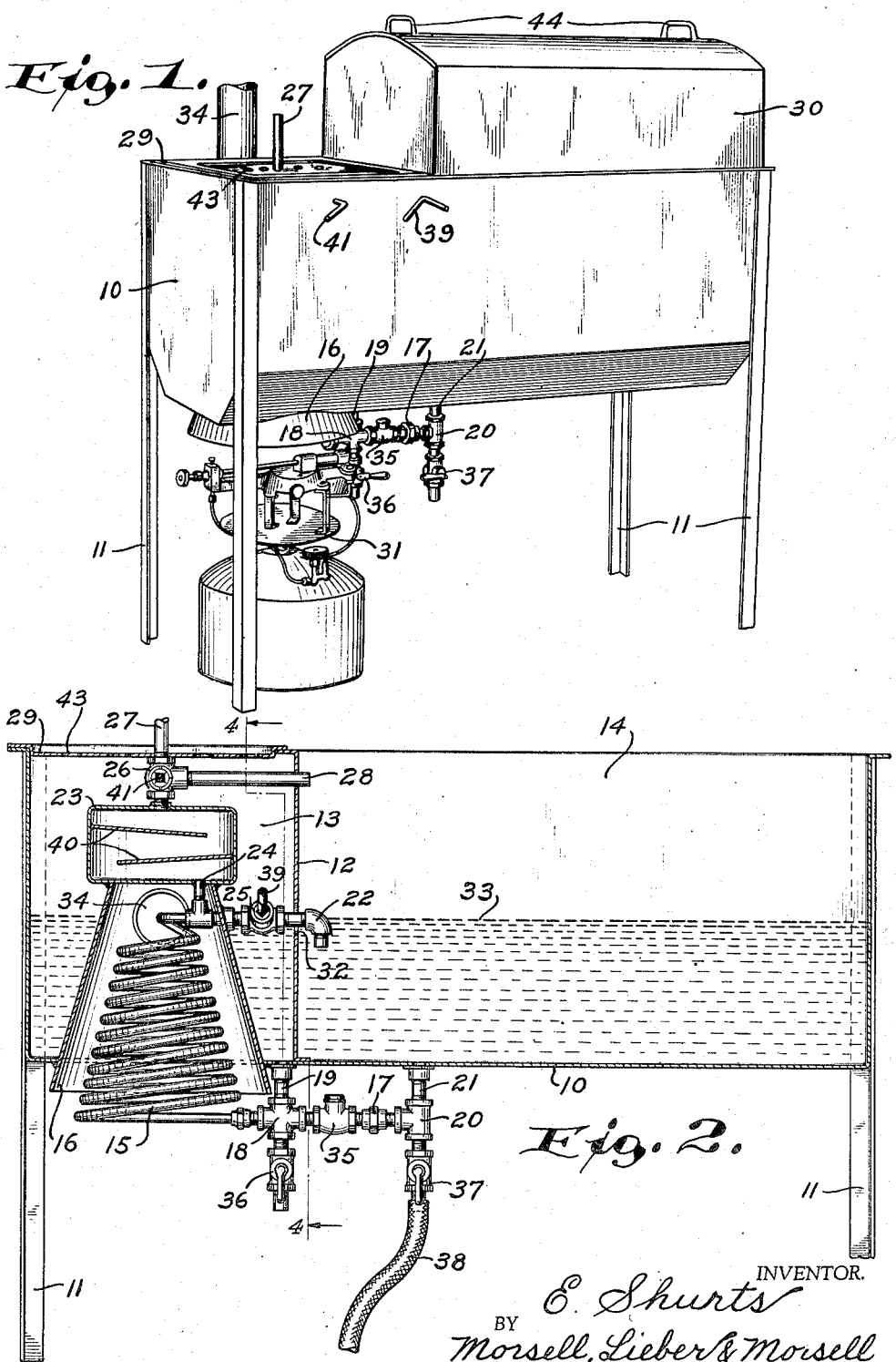

Patented Feb. 13, 1940

2,190,165

UNITED STATES PATENT OFFICE 2,190,165

DAIRY APPLIANCE

Englebert Shurts, Waukesha, Wis., assignor to Strauss Electric Appliance Company, Waukesha, Wis., a corporation of Wisconsin Application July 21, 1937, Serial No. 154,760

16 Claims. (Cl. 141—7)

My present invention relates generally to improvements in the art of maintaining dairy utensils and equipment in sanitary condition, and relates more specifically to improved appliances for effecting washing or rinsing and subsequent steam sterilization of utensils such as are ordinarily used in the dairy industry.

In general, my present invention contemplates provision of an improved liquid heater and steam generator, which is readily convertible from one class of use to another, and vice versa.

In my application Serial No. 150,986, filed June 29, 1937, I have shown and described a new type of dairy equipment comprising a readily convertible electric water heater and steam generator detachably suspended from a liquid basin or container for initially washing or rinsing utensils such as milk cans or pails, and having means for supporting the utensils for drainage and subsequent steam sterilization. While this prior equipment is highly satisfactory in every respect, some of the smaller and outlying dairies are not provided with a suitable source of electric power for operating such heating appliances, so that other than electric heating means becomes desirable for such installations. Any heating appliances provided for this purpose must however be free from danger such as fire hazard and explosion; and in providing a substitute for electric heating, the portability, compactness, and general utility of the entire structure must be preserved.

It is therefore a more specific object of my present invention to provide a convertible water heater and steam generator unit which may be safely fired with any form of available heating means, and which is extremely flexible and highly efficient in operation.

Another specific object of the present invention is the provision of an improved flash type of heating unit having conveniently manipulable means for converting the unit from a water heater into a steam generator, and vice versa, and for dispensing the heated liquid or steam for diverse uses.

Still another specific object of my invention is to provide a new and useful appliance especially adapted for use in the dairy industry, wherein both washing and sterilizing of utensils such as milk pails, cans and the like, may be quickly and conveniently effected in a compact and durable portable unit.

An additional specific object of the invention is to provide a readily manipulable gas fired dairy utensil washing and sterilizing unit, which may be manufactured and operated at moderate cost and which is extremely flexible in use.

A further specific object of the present invention is the provision of a neat appearing piece of dairy equipment which may be employed to quickly produce either hot water or steam for various uses, and all portions of which are readily accessible for inspection and cleaning.

These and additional objects and advantages will be apparent from the following detailed description.

A clear conception of the various features of my present improvement and of one actual commercial embodiment of the invention in a portable dairy appliance, may be had by referring to the drawings accompanying and forming a part of this specification in which like reference characters designate the same or similar parts in the several views.

Fig. 1 is a perspective view of one of the improved heating and sterilizing appliances, showing a standard gas generating heat producing device applied thereto;

Fig. 2 is an enlarged longitudinal central vertical section through the heating and sterilizing appliance of Fig. 1;

Fig. 3 is a full top view of the unit of Figs. 1 and 2 with the milk can support and washing chamber cover removed therefrom;

Fig. 4 is a transverse vertical section through the unit taken along the irregular line 4—4 of Fig. 2, and showing an inverted milk can undergoing sterilization;

Fig. 5 is an enlarged section through one of the control valves for the steam generator showing the same set for hot water heating only;

Fig. 6 is a similar section through the same valve, showing the same set for steam generation and delivery of steam to a can or other utensil as in Fig. 4; and Fig. 7 is another similar section through the same control valve, showing the same positioned for steam generation and delivery of steam to the utensil confining chamber.

Although my invention has been shown and described as being specifically embodied in a combined heater and sterilizer especially adapted for use in dairies, it is not my intention to thereby unnecessarily restrict the scope because the improved assemblage may obviously be used advantageously for other purposes, and some of the novel features disclosed but not specifically claimed herein form the subject of my copending application above identified.

Referring specifically to the drawings, my present improved heating and sterilizing unit comprises in general a main casing 10 which is supported by legs 11 and is divided by a transverse partition 12 into segregated chambers 13, 14; a heating coil 15 confined within a frusto-conical casing 16 which projects upwardly within the heating chamber 13; an inlet pipe 17 leading to the lower end of the coil 15 and communicating through a cross-fitting 18 and nipple 19 with the bottom of the chamber 13, and through a T-fitting 20 and nipple 21 with the lower portion of the washing and sterilizing chamber 14; a discharge pipe 22 leading from the upper end of the heating coil 15 to the interior of a steam dome 23 through a T-fitting and nipple 24, and also being communicable past a converting valve 25 with the medial portion of the chamber 14; a three-way control valve 26 cooperating with steam discharge pipes 27, 28 for directing steam either upwardly directly from the dome 23, or laterally therefrom into the upper portion of the chamber 14; a perforated utensil supporting plate 29 disposed over the chamber 13 and around the pipe 27; a removable closure cover 30 for enclosing the washing and sterilizing chamber 14; and a portable heating appliance 31 adapted to be disposed beneath the heating coil 15. The heating appliance 31 may be of any desired type utilizing either solid, liquid or gaseous fuel, or being energized electrically if so desired.

The main casing 10 may be formed of any suitable material such as sheet metal and may be coated or polished so as to prevent corrosion and to facilitate cleaning. While the heating chamber 13 may be of relatively limited capacity, the chamber 14 is preferably of sufficient size to receive one or more milk cans, pails and other utensils, and the two chambers 13, 14 are preferably connected by an opening 32 in the partition 12 for the purpose of equalizing the level of the liquid 33 in the two chambers. The heating coil 15 may be formed of copper or other suitable tubing spirally and helically wound so as to insure most efficient application of the heat from a heating appliance 31, and the upper end of the tapered casing 16 is provided with a spent gas outlet stack 34 which may be extended upwardly at the side of the unit.

The water inlet pipe 17 which communicates with the heating coil 15, has a non-return check valve 35 therein between the fittings 18, 20, which will permit free flow of liquid from the tank chamber 14 to the coil 15, but not reversely. The cross-fitting 18 has a drain valve 36 associated therewith, opening of which will effect drainage of all liquid from both of the chambers 13, 14. The T-fitting 20 has a similar drain valve 37 associated therewith and communicating with a drainage hose 38, and opening of the valve 37 will effect drainage of the chamber 14 without affecting the liquid in the heating chamber 13.

The converting valve 25 is operable from the exterior of the main casing 10 by means of a handle 39, and when this valve is open, hot water is being produced in the coil 15 and is delivered into the chamber 14 through the discharge pipe 22. When the valve 25 is closed, the heater is converted into a steam generator and steam is then delivered through the nipple 24 into the steam dome 23. The interior of the steam dome 23 is provided with several superimposed inclined drain plates 40 for returning condensate to the bottom of the dome, and the nipple 24 communicates with the dome interior beneath one of these plates. The three-way control valve 26 is also operable from the exterior of the casing 10 by means of a manipulating handle 41, and this valve may be set to any of the positions shown in Figs. 5, 6 and 7, and should be positioned as shown in Fig. 5 when the converting valve 25 is open.

The utensil supporting plate 29 is preferably slightly dished as shown in Fig. 4 so as to cause liquid which may drain upon this plate from the inverted cans 42, to pass through the perforations 43 and return to the chamber 13. This plate 29 is readily removable and the steam discharge pipe 27 preferably extends some distance above the top of the plate 29, while the other steam delivery pipe 28 and the valve 26 are located therebeneath. The closure cover 30 for the washing and sterilizing chamber 14, may also be formed of sheet metal, and is readily removable by means of handles 44 associated with the upper portion thereof. It should be noted, that when the plate 29 and cover 30 are removed, all portions of the interior of the chambers 13, 14 are readily accessible for inspection and cleaning.

When the improved heating and sterilizing unit has been properly constructed and assembled, it may be interchangeably utilized either for the production of hot water alone, or for steam generation and delivery of steam either into a milk can 42 or other utensil disposed over the pipe 27, or into the chamber 14 through the pipe 28. If the apparatus is to be utilized merely for the production of hot water as for the purpose of washing cans 42 and other utensils in the chamber 14, the chambers 13, 14 should be supplied with liquid 33 as indicated in Fig. 2, the cover 44 would ordinarily be removed, the converting valve 25 should be opened, the drain valves 36, 37 should be closed, and the three-way valve 26 should be positioned as shown in Fig. 5 so that the pipes 27, 28 are shut off. As heat is applied with the aid of a heater 31, to the coils 15 which are then constantly filled with liquid, this liquid becomes heated and produces a constant circulation of water from the bottom of the chambers 13, 14 through the inlet pipe 17, coil 15, and outlet pipe 22 to the upper portion of the liquid basin 33. The hot gases from the heater 31 after passing through the coil 15 will also impinge against the interior of the frusto-conical casing 16 and will thus heat the liquid within the chamber 13, the spent gases of combustion being subsequently discharged through the stack 34. The liquid 33 will thus become quickly heated and when sufficient heating has been effected, the heating appliance 31 may be removed, or it may be adjusted so as to apply only sufficient heat to maintain the desired temperature of the liquid 33 within the chamber 14.

If it becomes desirable to generate steam, the converting valve 25 should be closed, and the three-way valve 26 should be opened either as shown in Fig. 6 to connect the pipe 27 with the steam dome 23, or as in Fig. 7 with the pipe 28 in communication with the steam dome. When heat is applied to the coil 15 after the valves 25, 26 have been thus adjusted, the liquid within the coil 15 will be quickly converted into steam which is delivered through the pipe 24 into the steam dome 23. The steam must pass along a circuitous path through the dome 23 due to the disposition of the baffle plates 40, and relatively dry steam is therefore delivered to the valve 26. As the liquid within the coil 15 is converted into steam, most of the fresh pre-heated liquid 33 is constantly supplied from the chamber 13 through the nipple 19 and fitting 18, this liquid being pre-heated by the flow of hot gases along the interior of the casing 16.

In case the generated steam is to be discharged through the pipe 27 and is to be utilized to sterilize milk cans 42 or other similar utensils, the liquid 33 need not necessarily be drained from the chamber 14, nor need the cover 30 be applied to this chamber. The successive cans 42 may be inverted and positioned upon the plate 29 over the upright pipe 27, and the generated steam will thus be delivered directly into the utensils. The water of condensation will drain upon the plate 29 and will thereafter be returned to the chamber 13, through the perforations 43. During such operation, the three-way valve 26 will be positioned as shown in Fig. 6, and in the event that the steam is to be delivered into the chamber 14, the valve 26 should be set as shown in Fig. 7. The liquid 33 should then be drained from the chamber 14 alone, by opening the drain valve 37; and after the utensils which are to be sterilized, have been inserted within the drained chamber 14, the cover 30 should be applied so as to prevent free escape of steam into the ambient atmosphere. During drainage of the chamber 14 by opening the valve 37, the check valve 35 will prevent withdrawal of liquid 33 from the chamber 13 below the level of the equalizing opening 22 in the partition 12; but all of the liquid 33 from both chambers 13, 14 may be readily removed by merely opening the other drain valve 36.

From the foregoing detailed description, it will be apparent that my present invention provides an extremely simple, compact and readily manipulable convertible water heater and steam generator, which is very flexible and highly efficient in operation. The unit is portable and may therefore be conveniently transferred from place to place, and any kind of heating may be readily utilized for the purpose of heating the coil 15 and the casing 16. The apparatus is moreover safe, since any excess pressures created in the steam generator will be quickly and automatically relieved through the inlet pipe and nipple 19 which are always in open communication with the heating liquid chamber 13; and the application of the heat to a coil 15 located within a casing 16, not only enhances the efficiency of heat transfer to a maximum, but also reduces the fire hazard. All of the control and drainage valves are moreover readily accessible for operation from the exterior of the chambers 13, 14, and the closure cover 30 and plate 29 are readily removable to permit free access to all portions of the apparatus. The conversion of the apparatus from one use to another is decidedly simple, and the unit has proven highly satisfactory especially for dairy service.

It should be understood that it is not desired to limit this invention to the exact details of construction or the precise mode of use, herein shown and described, for various modifications within the scope of the claims may occur to persons skilled in the art.

I claim:

1. In combination, a liquid receptacle forming a utensil confining chamber, a heating coil having a lower inlet and an upper outlet communicating with said chamber, a steam dome communicable with said coil, means for heating said coil, and means for interchangeably delivering fluid from said coil through said outlet or from said steam dome to said chamber.

2. In combination, a receptacle forming a liquid confining chamber and a heating chamber, a heating coil disposed within said heating chamber and having several outlets communicating with said liquid confining chamber, means for delivering liquid from one of said chambers to said coil, means for heating said coil, means for effecting delivery of hot water from said coil through one of said outlets, and means for effecting delivery of steam from said coil through another of said outlets.

3. In combination, a receptacle having a liquid heating chamber and a utensil confining chamber therein, a liquid circulating coil having an inlet communicable with both of said chambers and also having two outlets one of which is communicable with said utensil confining chamber, a steam dome communicable with the other of said outlets, means for heating said coil, and means for closing said one of said outlets to convert said coil into a steam generator for delivery of steam through the other outlet.

4. In combination, a receptacle having a liquid heating chamber and a utensil confining chamber therein, a liquid circulating coil having an inlet communicable with both of said chambers and also having two outlets one of which is communicable with said utensil confining chamber, a steam dome communicable with the other of said outlets, means for heating said coil, means for closing said one of said outlets to convert said coil into a steam generator for delivery of steam through the other outlet, and means for conducting the steam from said other outlet to said utensil confining chamber.

5. In combination, a receptacle having segregated liquid confining chambers therein, a heating coil formed to receive liquid from both of said chambers, means for heating said coil, and means for diverting either steam or hot water from said coil to one of said chambers.

6. In combination, a liquid receptacle having segregated heating and utensil confining chambers therein, a tubular casing projecting upwardly into said heating chamber and having a steam dome at the upper end thereof, a heating coil within said casing and having an inlet communicating with both of said chambers, said coil having outlets communicating directly with said dome and with said utensil confining chamber, and means for delivering steam from said dome either to said utensil confining chamber or upwardly directly from the dome.

7. In combination, a receptacle having segregated liquid confining chambers, a heating coil formed to receive liquid from said chambers, means for heating said coil and for simultaneously preheating the liquid in one of said chambers, and means for diverting hot water from said coil to the other of said chambers.

8. In combination, means forming segregated liquid confining chambers, a heating coil having an inlet communicable with both of said chambers, means for heating said coil, and means for diverting either steam or hot water from said coil to one of said chambers.

9. In combination, means forming segregated liquid confining chambers, a heating coil having an inlet communicable with both of said chambers, means for heating said coil and for simultaneously preheating the liquid in one of said chambers, and means for diverting either steam or hot water from said coil to the other of said chambers.

10. In combination, means forming segregated liquid confining chambers, a heating coil having an inlet communicable with both of said chambers, means for heating said coil and for simultaneously preheating the liquid in one of said chambers, means for diverting either steam or hot water from said coil to the other of said chambers, and a removable closure for said other chamber.

11. In combination, means forming segregated heating and utensil confining chambers, a casing projecting into said heating chamber and having a steam dome at its end within said chamber, a heating coil within said casing and having an inlet communicable with said chambers, said coil having outlets communicable directly with said dome and with said utensil confining chamber, and means for delivering steam from said dome either to said utensil confining chamber or upwardly directly from said heating chamber.

12. In combination, means forming segregated heating and utensil confining chambers, a casing projecting into said heating chamber and having a steam dome at its end within said chamber, a heating coil within said casing and having an inlet communicable with said chambers, said coil having outlets communicable directly with said dome and with said utensil confining chamber, a removable closure for said utensil confining chamber, and means for delivering steam from said dome either to said utensil confining chamber or upwardly directly from said heating chamber.

13. In combination, means forming segregated heating and utensil confining chambers, a casing projecting into said heating chamber and having a steam dome at its end within said chamber, a heating coil within said casing and having an inlet communicable with either of said chambers, said coil having outlets communicable directly with said dome and with said utensil confining chamber, means for delivering steam from said dome either to said utensil confining chamber or upwardly directly from said heating chamber, and a utensil support disposed above said heating chamber.

14. In combination, means forming segregated liquid storage and utensil confining chambers, a heating coil having a lower inlet communicable with said chambers, a steam dome communicable directly with the upper outlet end of said coil, said coil also having an outlet connection communicable directly with said utensil confining chamber, and means for delivering steam from said dome either to said utensil confining chamber or upwardly directly from said dome.

15. In combination, means forming segregated liquid storage and utensil confining chambers, a heating coil having a lower inlet communicable with said chambers, a steam dome communicable directly with the upper outlet end of said coil, said coil also having an outlet connection communicable directly with said utensil confining chamber, a removable closure for said utensil confining chamber, and means for delivering steam from said dome either to said utensil confining chamber or upwardly directly from said dome.

16. In combination, means forming segregated liquid storage and utensil confining chambers, a heating coil having a lower inlet communicable with said chambers, a steam dome communicable directly with the upper outlet end of said coil, said coil also having an outlet connection communicable directly with said utensil confining chamber, means for delivering steam from said dome either to said utensil confining chamber or upwardly directly from said dome, and a utensil support disposed above said dome.

ENGLEBERT SHURTS.